US012673641B2

(12) United States Patent (10) Patent No.: US 12,673,641 B2
Ratner (45) Date of Patent: Jul. 7, 2026

(54) RAPID DECELERATION MECHANISM WITH SLIDING CARRIAGE

(71) Applicant: Nuro, Inc., Mountain View, CA (US)

(72) Inventor: Daniel Jason Ratner, San Francisco, CA (US)

(73) Assignee: NURO, INC., Mountain View, CA (US)

( * ) Notice: Subject to any disclaimer, the term of this patent is extended or adjusted under 35 U.S.C. 154(b) by 323 days.

(21) Appl. No.: 18/235,783

(22) Filed: Aug. 18, 2023

(65) Prior Publication Data

US 2024/0092319 A1 Mar. 21, 2024

Related U.S. Application Data

(60) Provisional application No. 63/408,535, filed on Sep. 21, 2022.

(51) Int. Cl.
B60T 1/14 (2006.01)
B60T 7/12 (2006.01)

(52) U.S. Cl.
CPC ........ B60T 1/14 (2013.01); B60T 7/12 (2013.01); B60T 2201/03 (2013.01)

(58) Field of Classification Search
CPC ........... B60T 1/14; B60T 7/12; B60T 2201/03
See application file for complete search history.

(56) References Cited

U.S. PATENT DOCUMENTS

| | | | |
|---|---|---|---|
| 2,300,725 A | 11/1942 | Cieri | |
| 3,605,954 A | 9/1971 | Wakabayashi et al. | |
| 4,066,151 A | 1/1978 | Liebscher et al. | |
| 4,265,338 A | 5/1981 | Shea et al. | |
| 4,317,507 A | 3/1982 | McMillan | |
| 5,439,076 A | 8/1995 | Percy, Jr. | |
| 5,444,949 A | 8/1995 | Ciaccio | |
| 5,638,923 A | 6/1997 | Liu | |
| 9,487,190 B1 | 11/2016 | Alvarado | |
| 10,369,976 B1 | 8/2019 | Ratner | |
| 11,598,383 B2 * | 3/2023 | Krasnoff | ................. F16D 63/00 |
| 2008/0136133 A1 | 6/2008 | Takahashi | |
| 2010/0084426 A1 | 4/2010 | Devers et al. | |
| 2011/0017538 A1 | 1/2011 | Baumann | |
| 2011/0155496 A1 | 6/2011 | Baumann et al. | |

(Continued)

FOREIGN PATENT DOCUMENTS

| | | |
|---|---|---|
| DE | 3437402 A1 | 4/1986 |
| DE | 102005009949 A1 | 9/2006 |

(Continued)

*Primary Examiner* — Timothy Hannon

(74) *Attorney, Agent, or Firm* — Edell, Shapiro & Finnan, LLC

(57) ABSTRACT

According to one aspect, a vehicle includes a body and a rapid deceleration system that is configured to decelerate the body traveling on a road surface. The rapid deceleration system includes at least a first rapid deceleration mechanism coupled to the body, the first rapid deceleration mechanism including a first anchor, a first slider, and a first energetics arrangement configured to propel the at first anchor from the body toward the road surface to decelerate the body, wherein the first slider moves along a first axis to dissipate energy when the first anchor is propelled toward the road surface along a second axis.

15 Claims, 14 Drawing Sheets

501a 502b 502a

546

350 454a'

542

(56)                    References Cited

U.S. PATENT DOCUMENTS

| | | |
|---|---|---|
| 2011/0198161 A1 | 8/2011 | Lomazzo |
| 2013/0037355 A1 | 2/2013 | Baker et al. |
| 2014/0081445 A1 | 3/2014 | Villamar |
| 2014/0191078 A1 | 7/2014 | Boren et al. |
| 2015/0006005 A1 | 1/2015 | Yu et al. |
| 2017/0101095 A1 | 4/2017 | Nilsson et al. |
| 2017/0174343 A1 | 6/2017 | Erickson et al. |
| 2019/0210595 A1 | 7/2019 | Cheaz et al. |
| 2019/0263365 A1 | 8/2019 | Krasnoff |
| 2022/0227335 A1* | 7/2022 | Ratner .................. F16D 63/008 |

FOREIGN PATENT DOCUMENTS

| | | |
|---|---|---|
| KR | 200400090 A | 1/2004 |
| WO | 2017117303 A1 | 7/2017 |

* cited by examiner

705 ⟶

852

864

862

860

RAPID DECELERATION MECHANISM WITH SLIDING CARRIAGE

CROSS REFERENCE TO RELATED APPLICATION

This application claims priority to U.S. Provisional Application No. 63/408,535, filed on Sep. 21, 2022, and entitled "RAPID DECELERATION MECHANISM WITH SLIDING CARRIAGE," the contents of which are incorporated herein by reference in their entirety.

TECHNICAL FIELD

The disclosure relates generally to autonomous vehicles. More particularly, the disclosure relates to systems and method for rapidly decelerating an autonomous vehicle.

BACKGROUND

As vehicles drive, autonomously or under the control of an operator or driver, there are many instances in which vehicles in motion need to stop as quickly as possible. For example, when a pedestrian crosses a roadway directly in a path of a vehicle, the vehicle generally must either take evasive measures or come to a fast stop to avoid striking the pedestrian. In many instances, it may not be possible for a vehicle to swerve or to stop fast enough to avoid a collision.

The ability to come to a fast stop, or to decelerate rapidly, is crucial to allow vehicles to avoid collisions. Known solutions which decelerate a vehicle include Torricelli brakes, air brakes, hydraulic brakes, and pneumatic brakes. Such brakes, while generally allowing vehicles to brake, are inadequate to provide rapid deceleration due to significant frictional forces that arise when the brakes are engaged.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
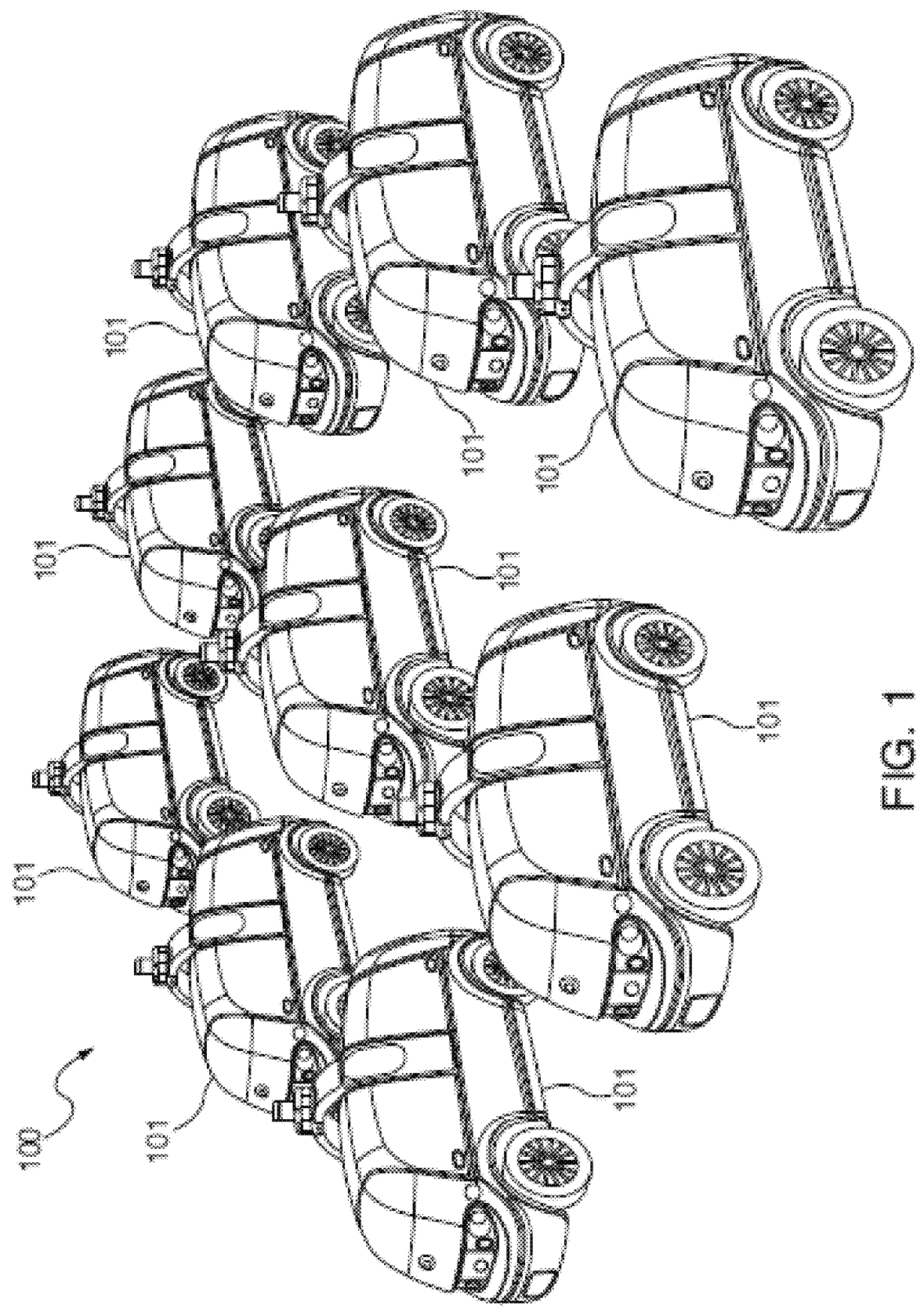
FIG. 1 is a diagrammatic representation of an autonomous vehicle fleet in accordance with an embodiment.

According to one embodiment, a vehicle includes a body and a rapid deceleration system that is configured to decelerate the body traveling on a road surface. The rapid deceleration system includes at least a first rapid deceleration mechanism coupled to the body, the first rapid deceleration mechanism including a first anchor, a first slider, and a first energetics arrangement configured to propel the first anchor from the body toward the road surface to decelerate the body, wherein the first slider moves along a first axis to dissipate energy when the first anchor is propelled toward the road surface along a second axis. In one embodiment, the vehicle also includes an energy absorbing or absorption arrangement configured to absorb the energy when the first slider comes into contact with the energy absorbing or absorption arrangement.

In accordance with another embodiment, a rapid deceleration system includes at least a first anchor coupled to a body of a vehicle and at least a first energetics arrangement configured to propel the at least first anchor in a first direction toward a road surface on which the vehicle is traveling to decelerate the vehicle. The rapid deceleration system also includes at least a first slider, the at least first slider arranged to move in a second direction when the first anchor is propelled toward the road surface.

In accordance with still another embodiment, a method includes deploying, from a vehicle, using at least a first energetics arrangement of a rapid deceleration system, at least a first anchor of the rapid deceleration system attached to a body of the vehicle in a first direction toward a surface on which the vehicle is travelling. The rapid deceleration system further includes at least a first slider arranged to move in a second direction to absorb energy generated when the at least first anchor is deployed. The method also includes decelerating the vehicle by transferring the energy generated when the at least first anchor is deployed from the at least first slider to a first energy absorption arrangement.

An overall rapid deceleration system includes one or more anchors, rams, or bollards which are mounted on one or more sliding carriages. The sliding carriages, or sliders, are configured to effectively move laterally when anchors are deployed into certain surfaces. The lateral movement of sliding carriages may enable energy absorbing mechanisms to absorb at least some energy associated with the deployment of anchors, as for example by deforming. The sliding carriages may remain substantially stationary, or may not move significantly, when anchors are deployed into other surfaces. When the sliding carriages remain substantially stationary, energy associated with the deployment of the anchors may be dissipated into, or otherwise significantly absorbed by, the surface into which the anchors are deployed.

DESCRIPTION

While braking systems on a vehicle such as an autonomous vehicle may serve to provide adequate deceleration and braking in most situations, some situations may arise in which rapid deceleration that may not be accomplished using braking systems may be needed. For example, if a vehicle is travelling or driving and an obstacle such as a pedestrian suddenly appears directly in front of the vehicle, the use of braking systems may not be adequate to prevent the vehicle from colliding with the obstacle.

By providing a rapid deceleration system or mechanism for use when a braking system on a vehicle is expected to be inadequate to prevent a vehicle from a collision, the chances of a collision may be reduced. A rapid deceleration system mounted on a vehicle may include one or more anchors or rams which are configured to effectively anchor a vehicle to a surface such as a road surface. Energetics arrangements may be used to deploy the anchors when it is determined that the vehicle is to come to a substantially immediate stop.

A rapid decelerations system may include one or more anchors, and one or more sliding carriages, e.g., sliders. Such sliders may be coupled to the anchors, configured to slide or to otherwise translate along a frame of a vehicle when the anchors are deployed into particular surfaces. By way of example, a slider may slide with respect to a frame of a vehicle when an anchor is deployed into a surface such as concrete, while the slider may remain substantially stationary when the anchor is deployed into a surface such as asphalt. The slider may slide to facilitate the removal or dissipation of energy and, in some instances, may slide to enable contact with an energy absorbing arrangement such as a crush can. The slider may not slide and may, instead, remain substantially stationary when an anchor effectively cuts a channel into a surface upon being deployed and, thus, allows for energy to be removed or dissipated through the surface. The use of a slider, thus, enables a rapid deceleration system to be effective in allowing a vehicle to rapidly decelerate, regardless of whether a surface is a concrete surface or an asphalt surface.

Referring initially to FIG. 1, an autonomous vehicle fleet will be described in accordance with an embodiment. An autonomous vehicle fleet 100 includes a plurality of autonomous vehicles 101, or robot vehicles. Autonomous vehicles 101 are generally arranged to transport and/or to deliver cargo, items, and/or goods. Autonomous vehicles 101 may be fully autonomous and/or semi-autonomous vehicles. In general, each autonomous vehicle 101 may be a vehicle that is capable of travelling in a controlled manner for a period of time without intervention, e.g., without human intervention. As will be discussed in more detail below, each autonomous vehicle 101 may include a power system, a propulsion or conveyance system, a navigation module, a control system or controller, a communications system, a processor, and a sensor system.

Dispatching of autonomous vehicles 101 in autonomous vehicle fleet 100 may be coordinated by a fleet management module (not shown). The fleet management module may dispatch autonomous vehicles 101 for purposes of transporting, delivering, and/or retrieving goods or services in an unstructured open environment or a closed environment.

Figure 2:
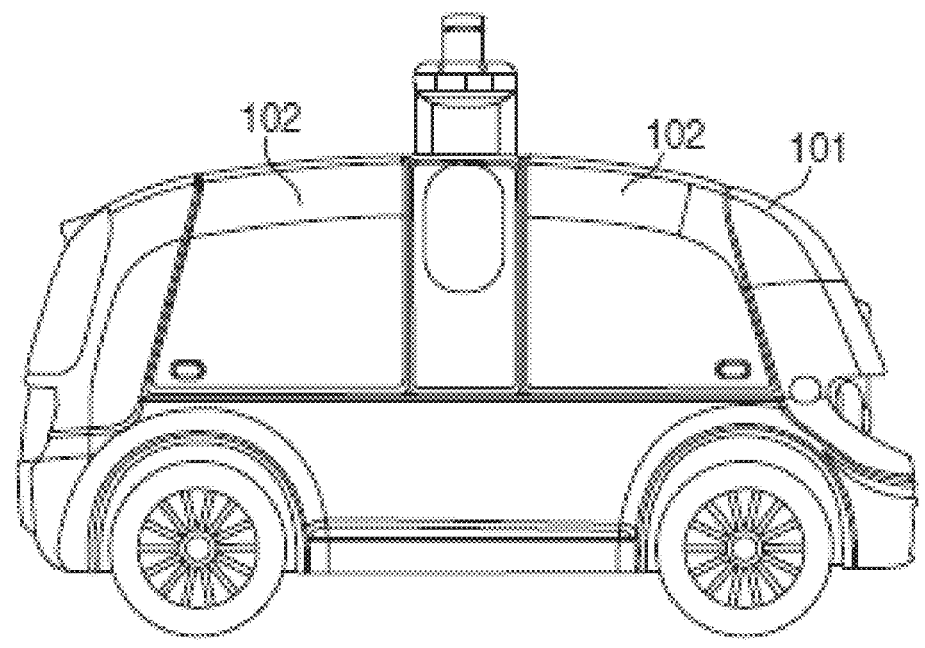
FIG. 2 is a diagrammatic representation of a side of an autonomous vehicle in accordance with an embodiment.

FIG. 2 is a diagrammatic representation of a side of an autonomous vehicle, e.g., one of autonomous vehicles 101 of FIG. 1, in accordance with an embodiment. Autonomous vehicle 101, as shown, is a vehicle configured for land travel. Typically, autonomous vehicle 101 includes physical vehicle components such as a body or a chassis, as well as conveyance mechanisms, e.g., wheels. In one embodiment, autonomous vehicle 101 may be relatively narrow, e.g., approximately two to approximately five feet wide, and may have a relatively low mass and relatively low center of gravity for stability. Autonomous vehicle 101 may be arranged to have a working speed or velocity range of between approximately one and approximately forty-five miles per hour (mph), e.g., approximately twenty-five miles per hour. In some embodiments, autonomous vehicle 101 may have a substantially maximum speed or velocity in range between approximately thirty and approximately ninety mph.

Autonomous vehicle 101 includes a plurality of compartments 102. Compartments 102 may be assigned to one or more entities, such as one or more customer, retailers, and/or vendors. Compartments 102 are generally arranged to contain cargo, items, and/or goods. Typically, compartments 102 may be secure compartments. It should be appreciated that the number of compartments 102 may vary. That is, although two compartments 102 are shown, autonomous vehicle 101 is not limited to including two compartments 102.

Figure 3:
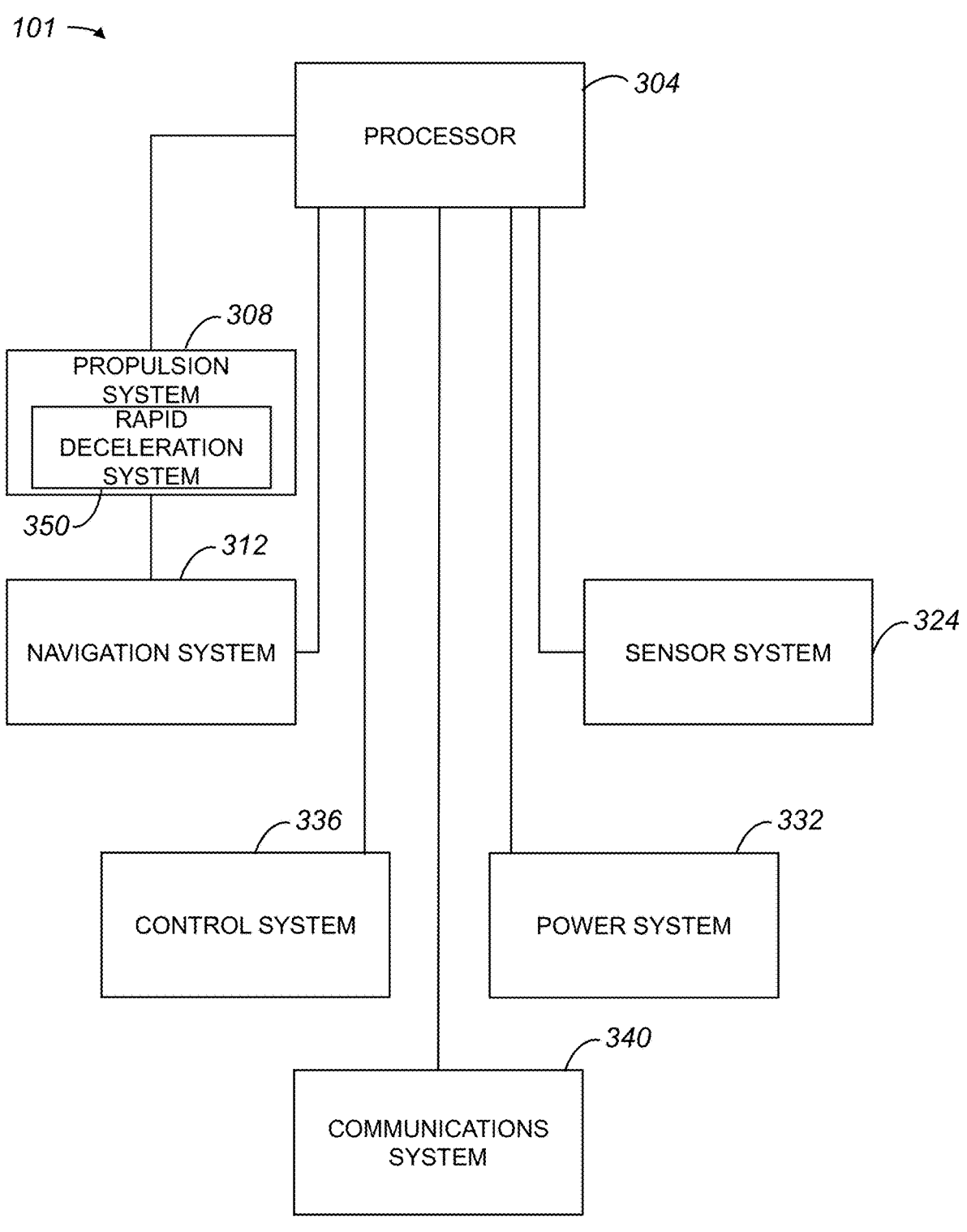
FIG. 3 is a block diagram representation of an autonomous vehicle in accordance with an embodiment.

FIG. 3 is a block diagram representation of an autonomous vehicle, e.g., autonomous vehicle 101 of FIG. 1, in accordance with an embodiment. An autonomous vehicle 101 includes a processor 304, a propulsion system 308, a navigation system 312, a sensor system 324, a power system 332, a control system 336, and a communications system 340. It should be appreciated that processor 304, propulsion system 308, navigation system 312, sensor system 324, power system 332, and communications system 340 are all coupled to a chassis or body of autonomous vehicle 101.

Processor 304 is arranged to send instructions to and to receive instructions from or for various components such as propulsion system 308, navigation system 312, sensor system 324, power system 332, and control system 336. Propulsion system 308, or a conveyance system, is arranged to cause autonomous vehicle 101 to move, e.g., drive. For example, when autonomous vehicle 101 is configured with a multi-wheeled automotive configuration as well as steering, braking systems and an engine, propulsion system 308 may be arranged to cause the engine, wheels, steering, and braking systems to cooperate to drive. In general, propulsion system 308 may be configured as a drive system with a propulsion engine, wheels, treads, wings, rotors, blowers, rockets, propellers, brakes, etc. The propulsion engine may be a gas engine, a turbine engine, an electric motor, and/or a hybrid gas and electric engine. Propulsion system 308 includes a rapid deceleration system 350 that may be configured to facilitate the rapid deceleration of vehicle 101, e.g., when braking systems are not sufficient to cause vehicle 101 to rapidly decelerate. In one embodiment, rapid deceleration system 350 includes two or more anchors that are each powered by a powered driver that propels the anchors from the powered driver into a road surface. Rapid deceleration system or mechanism 350 will be discussed below with respect to FIG. 4.

Navigation system 312 may control propulsion system 308 to navigate autonomous vehicle 101 through paths and/or within unstructured open or closed environments. Navigation system 312 may include at least one of digital maps, street view photographs, and a global positioning system (GPS) point. Maps, for example, may be utilized in cooperation with sensors included in sensor system 324 to allow navigation system 312 to cause autonomous vehicle 101 to navigate through an environment.

Sensor system 324 includes any sensors, as for example LiDAR, radar, ultrasonic sensors, microphones, altimeters, and/or cameras. Sensor system 324 generally includes onboard sensors which allow autonomous vehicle 101 to safely navigate, and to ascertain when there are objects near autonomous vehicle 101. In one embodiment, sensor system 324 may include propulsion systems sensors that monitor drive mechanism performance, drive train performance, and/or power system levels.

Power system 332 is arranged to provide power to autonomous vehicle 101. Power may be provided as electrical power, gas power, or any other suitable power, e.g., solar power or battery power. In one embodiment, power system 332 may include a main power source, and an auxiliary power source that may serve to power various components of autonomous vehicle 101 and/or to generally provide power to autonomous vehicle 101 when the main power source does not have the capacity to provide sufficient power.

Communications system 340 allows autonomous vehicle 101 to communicate, as for example, wirelessly, with a fleet management system (not shown) that allows autonomous vehicle 101 to be controlled remotely. Communications system 340 generally obtains or receives data, stores the data, and transmits or provides the data to a fleet management system and/or to autonomous vehicles 101 within a fleet 100. The data may include, but is not limited to including, information relating to scheduled requests or orders, information relating to on-demand requests or orders, and/or information relating to a need for autonomous vehicle 101 to reposition itself, e.g., in response to an anticipated demand.

In some embodiments, control system 336 may cooperate with processor 304 to determine where autonomous vehicle 101 may safely travel, and to determine the presence of objects in a vicinity around autonomous vehicle 101 based on data, e.g., results, from sensor system 324. In other words, control system 336 may cooperate with processor

304 to effectively determine what autonomous vehicle 101 may do within its immediate surroundings. Control system 336 in cooperation with processor 304 may essentially control power system 332 and navigation system 312 as part of driving or conveying autonomous vehicle 101. Additionally, control system 336 may cooperate with processor 304 and communications system 340 to provide data to or obtain data from other autonomous vehicles 101, a management server, a global positioning server (GPS), a personal computer, a teleoperations system, a smartphone, or any computing device via the communication module 340. In general, control system 336 may cooperate at least with processor 304, propulsion system 308, navigation system 312, sensor system 324, and power system 332 to allow vehicle 101 to operate autonomously. That is, autonomous vehicle 101 is able to operate autonomously through the use of an autonomy system that effectively includes, at least in part, functionality provided by propulsion system 308, navigation system 312, sensor system 324, power system 332, and control system 336. Components of propulsion system 308, navigation system 312, sensor system 324, power system 332, and control system 336 may effectively form a perception system that may create a model of the environment around autonomous vehicle 101 to facilitate autonomous or semi-autonomous driving.

As will be appreciated by those skilled in the art, when autonomous vehicle 101 operates autonomously, vehicle 101 may generally operate, e.g., drive, under the control of an autonomy system. That is, when autonomous vehicle 101 is in an autonomous mode, autonomous vehicle 101 is able to generally operate without a driver or a remote operator controlling autonomous vehicle. In one embodiment, autonomous vehicle 101 may operate in a semi-autonomous mode or a fully autonomous mode. When autonomous vehicle 101 operates in a semi-autonomous mode, autonomous vehicle 101 may operate autonomously at times and may operate under the control of a driver or a remote operator at other times. When autonomous vehicle 101 operates in a fully autonomous mode, autonomous vehicle 101 typically operates substantially only under the control of an autonomy system. The ability of an autonomous system to collect information and extract relevant knowledge from the environment provides autonomous vehicle 101 with perception capabilities. For example, data or information obtained from sensor system 324 may be processed such that the environment around autonomous vehicle 101 may effectively be perceived.

The ability to rapidly decelerate a vehicle such as autonomous vehicle 101 enhances the ability of the vehicle to operate safely by increasing the likelihood that the vehicle may avoid collisions, e.g., by rapidly slowing to a stop in a relatively fast manner. When it is determined that a primary or "normal" braking system is unlikely to be sufficient to avoid an obstacle located along an immediate path a vehicle, a secondary or "emergency" deceleration system may be activated. Such a deceleration system may be arranged to rapidly decelerate by deploying a mechanism that cuts into a surface, e.g., a pavement or a surface of a roadway, to effectively anchor the vehicle to the surface.

In one embodiment, two anchors may be positioned and fired from a location on a vehicle that is substantially in front of a portion of a vehicle frame that is just in front of back wheels or back wheel wells. A rapid deceleration mechanism that includes the anchors may be arranged at least partially inside a vehicle, with the anchors arranged to be deployed such that, when deployed, the anchors are substantially outside of the vehicle, e.g., underneath the vehicle. Each back wheel or back wheel well may be associated with an anchor, or otherwise have an anchor positioned nearby. The anchors may be deployed, e.g., fired, into a surface such as a road surface at an angle that is between approximately zero degrees and approximately ninety degrees, e.g., between approximately fifteen degrees and approximately forty-five degrees. When the anchors are embedded into the road at this angle, the anchors may essentially contact the vehicle frame in front of the back wheel wells such that deployment energy may be at least partially absorbed by the vehicle frame. Further, because the anchors are deployed at an angle, as for example an angle of approximately forty-five degrees, upon anchors coming into contact with the vehicle frame, the vehicle may be deflected in a downwards direction towards the road surface.

Figure 4:
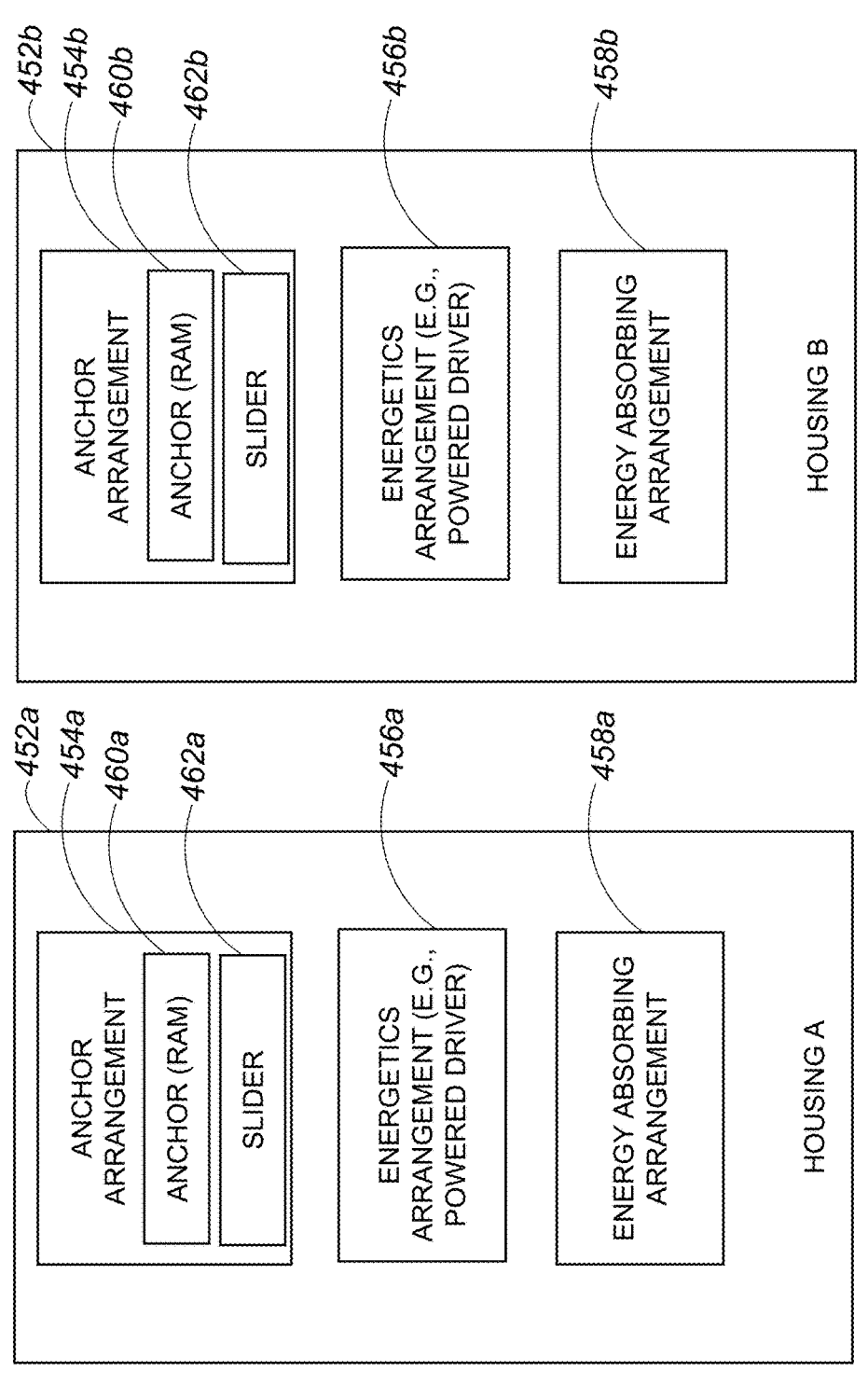
FIG. 4 is a block diagram representation of a rapid deceleration system or mechanism, e.g., rapid deceleration system 350 of FIG. 3, in accordance with an embodiment.

FIG. 4 is a block diagram representation of a rapid deceleration system or mechanism, e.g., rapid deceleration system 350 of FIG. 3, in accordance with an embodiment. Rapid deceleration system 350, as shown, includes two housing 452a, 452b, with each housing arranged to be positioned on a vehicle such as vehicle 101 of FIGS. 2 and 3 in front of a rear wheel or rear wheel well. Housing 452a includes an anchor arrangement 454a, an energetics arrangement such as a powered driver 456a, and an energy absorbing arrangement 458a. Housing 452b includes an anchor arrangement 454b, an energetics arrangement such as a powered driver 456b, and an energy absorbing arrangement 458b. In the described embodiment, anchor arrangement 454a includes an anchor 460a and a slider 462a, and anchor arrangement 454b includes an anchor 460b and a slider 460b.

Anchors, rams, or bollards 460a, 460b are configured to be deployed by energetics arrangements 456a, 456b, respectively. Anchors 460a, 460b, when deployed, effectively cut into a surface on which a vehicle such as vehicle 101 of FIGS. 2 and 3 is travelling or driving. The surface may generally be a road surface formed from any suitable material, as for example asphalt or concrete. The configuration of anchors 460a, 460b may vary widely. Anchors 460a, 460b may have various shapes and sizes, and may be formed from any suitable material, e.g., forged steel.

Energetics arrangements 456a, 456b, which may be actuating mechanisms or powered drivers, are configured to cause anchors 460a, 460b, respectively, to be deployed. Such deployment may include using energetics arrangements 456a, 456b to effectively propel anchors 460a, 460b, respectively, towards a road surface to cut into the road surface. Energetics arrangements 456a, 456b may include, but are not limited to including, pyrotechnic telescoping devices or other mechanisms which may be selectively activated to cause anchors 460a, 460b, respectively, to be propelled toward the road surface.

Optional energy absorbing or absorption arrangements 458a, 458b are arranged to dissipate energy, e.g., kinetic energy, that is generated when anchors 454a, 454b, respectively, are deployed to stop a vehicle such vehicle 101 of FIGS. 2 and 3. Optional energy absorbing arrangements 458a, 458b may be any suitable devices. Suitable devices include, but are not limited to including, hydraulic shocks, disc brakes, and/or structures that are designed to substantially crumple under shock loads. In one embodiment, when a vehicle frame is arranged to absorb energy associated with the deployment of anchors 454a, 454b, energy absorbing arrangement 458a, 458b may not be included in rapid deceleration system 350. It should be appreciated, however, that even if a vehicle frame is arranged to absorb energy associated with the deployment of anchors 454a, 454b, energy absorbing arrangement 458a, 458b may be included in rapid deceleration system 350.

Anchor arrangements 454a, 454b include sliders or sliding mounts 462a, 462b, respectively, as mentioned above. Sliders 462a, 462b are considered to slide horizontally, or along an axis that is substantially parallel to the surface into which anchors 460a, 460b are deployed. Sliders 462a, 462b may be configured to slide on rails, to slide within channels, and/or to slide on any suitable surface.

When anchor 460a is deployed, slider 462a may slide along a substantially horizontal axis and transfer energy to energy absorbing arrangement 458a to effectively cause energy absorbing arrangement 458a to deform. Similarly, when anchor 460b is deployed, slider 462b may slide along a substantially horizontal axis and transfer energy to energy absorbing arrangement 458b to effectively cause energy absorbing arrangement 458b to deform. It should be appreciated that when anchors 460a, 460b penetrate a surface, it is possible that sliders 462a, 462b, respectively, may remain in substantially the same position and may not cause energy absorbing arrangement 458a, 458b, respectively, to undergo deformation. In other words, characteristics of a surface such as a road surface may essentially determine whether sliders 462a, 462b translate when anchors 460a, 460b, respectively, are deployed into the road surface.

The amount by which sliders 462a, 462b may move or travel may vary. In some situations, the movement of sliders 462a, 462b may be substantially constrained to effectively prevent too much movement.

Figure 5A:
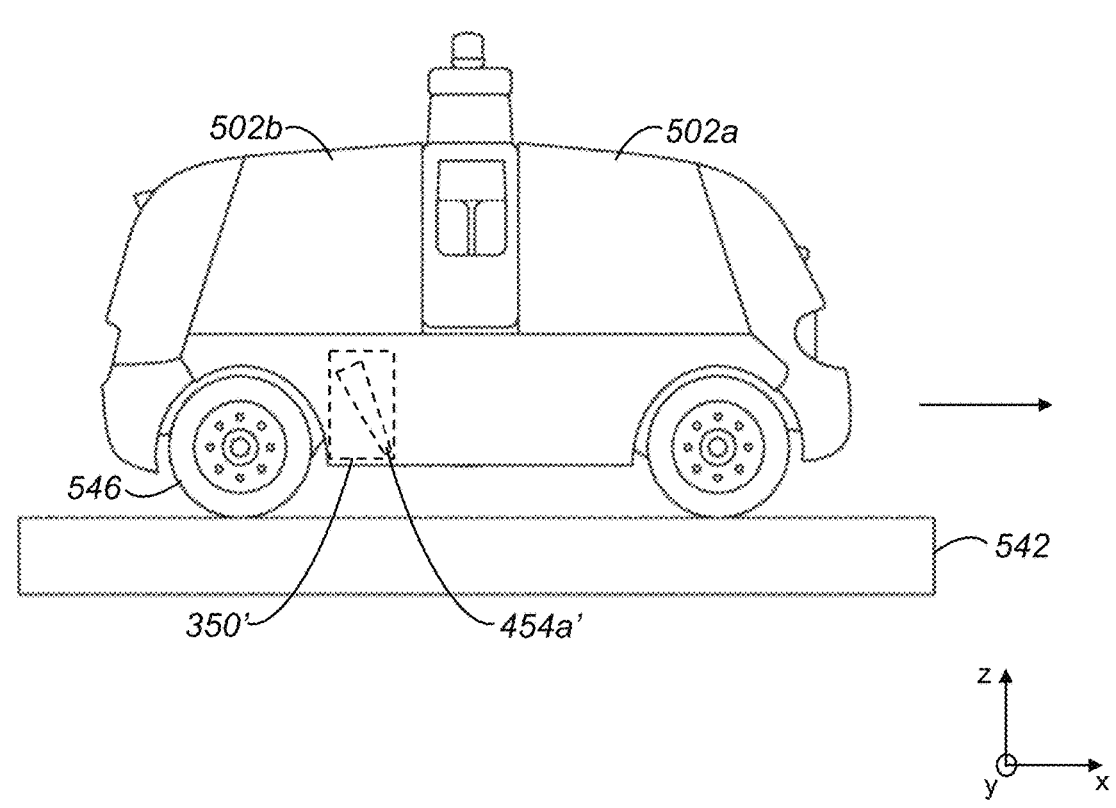
FIG. 5A is a diagrammatic representation of a side view of a vehicle with a rapid deceleration mechanism in a first state, e.g., an undeployed state, in which the rapid deceleration mechanism is towards a rear of the vehicle in accordance with an embodiment.

As mentioned above, rapid deceleration system 350 may be configured as two substantially separate modules 452a, 452b. Each module 452a, 452b may be positioned substantially in front of a rear wheel of a vehicle such as vehicle 101 of FIGS. 2 and 3. FIG. 5A is a diagrammatic representation of a side view of a vehicle with a rapid deceleration mechanism in a first state, e.g., an undeployed state, in which the rapid deceleration mechanism is positioned near a rear wheel of the vehicle in accordance with an embodiment. An autonomous vehicle 501a, which may include components and features of autonomous vehicle 101 of FIG. 1, is generally arranged to drive or be otherwise conveyed on a surface 542. Surface 542 may be a surface of a road, and may be a pavement surface such as concrete or asphalt.

Rapid deceleration system or mechanism 350' is mounted on autonomous vehicle 501a. As shown, rapid deceleration mechanism 350' is mounted on an inside of autonomous vehicle 501a near a bottom of autonomous vehicle 501a such that first anchor 454a' is positioned substantially in front of a rear wheel 546 of vehicle 501a. In one embodiment, a module of rapid deceleration mechanism 350' which includes anchor 454a' is positioned in front of right rear wheel 546 of vehicle 501a, while a module of rapid deceleration mechanism 350' which includes another anchor (not shown) is positioned in front of a left rear wheel (not shown) of vehicle 501a.

Rapid deceleration mechanism 350' is positioned substantially over surface 542, and is arranged to allow autonomous vehicle 501a to rapidly decelerate when rapid deceleration mechanism 350' is deployed. For example, if autonomous vehicle 501a is travelling in a direction along an x-axis when one or more anchors including anchor 454a' of rapid deceleration mechanism 350' is deployed, autonomous vehicle 501a may be decelerated or otherwise slowed as autonomous vehicle 501a travels in a direction along the x-axis.

The positioning or placement of rapid deceleration mechanism 350' in front of rear or back wheel 546 enables rapid deceleration mechanism 350' to be substantially inside of the autonomous vehicle 501*a* and, thus, effectively hidden from view. In addition, placing rapid deceleration mechanism 350' in an inner volume of autonomous vehicle 501*a* may effectively allow for a sound damping enclosure around an energetics or firing system that is relatively quiet.

In general, a rapid deceleration mechanism may be placed in any suitable fashion with respect to a carriage or chassis of a vehicle. For example, in lieu of being positioned in front of a rear or back wheels of a vehicle, one or more rapid deceleration mechanisms may be positioned closer to front wheels of the vehicle such that the vehicle may deploy the one or more rapid decelerations mechanism to substantially reduce an amount of impulse associated with the deployment. In one embodiment, one or more rapid deceleration mechanisms may additionally, or alternatively, be positioned at the rear of a vehicle substantially under a location at which a license plate is typically located.

Figure 5B:
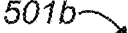
FIG. 5B is a diagrammatic representation of a side view of a vehicle with a rapid deceleration mechanism in a first state, e.g., an undeployed state, in which the rapid deceleration mechanism is towards a front of the vehicle in accordance with an embodiment.
Figure 5B:
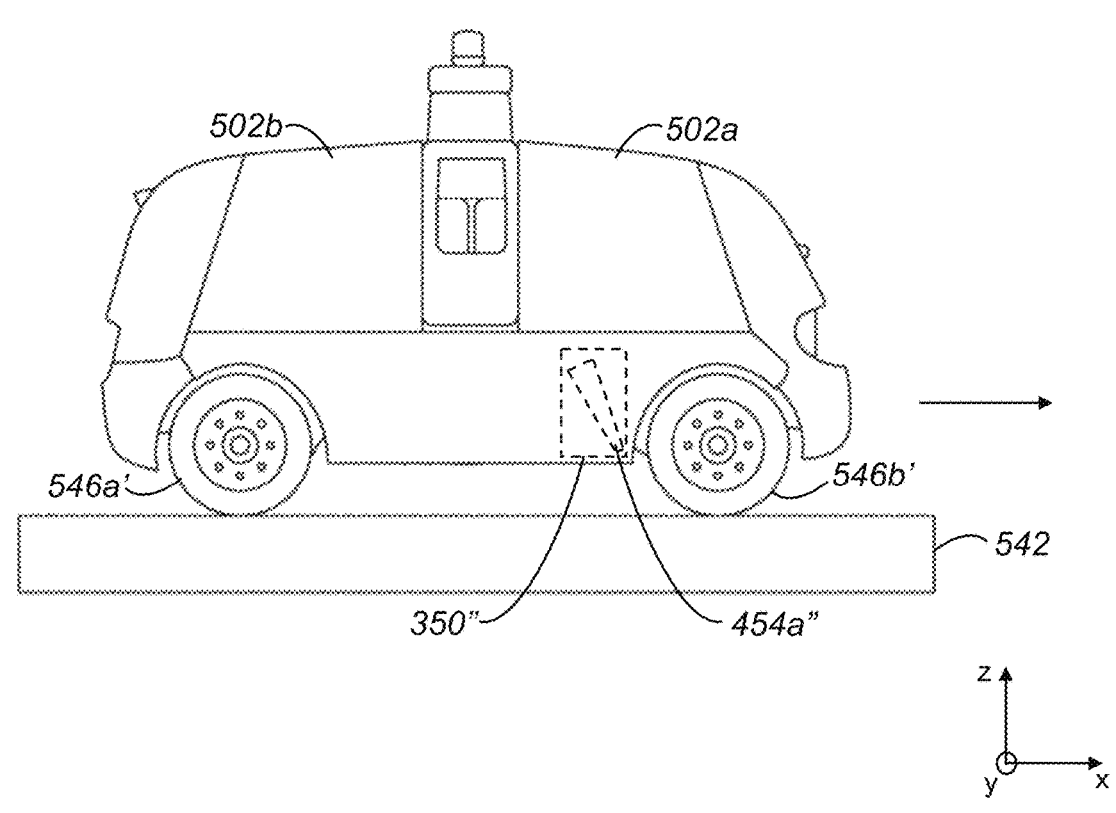

FIG. 5B is a diagrammatic representation of a side view of a vehicle with a rapid deceleration mechanism in a first state, e.g., an undeployed state, in which the rapid deceleration mechanism is positioned near a front wheel of the vehicle in accordance with an embodiment. An autonomous vehicle 501*b*, which may include components and features of autonomous vehicle 101 of FIG. 1, is generally arranged to drive or be otherwise conveyed on surface 542. Rapid deceleration system or mechanism 350" is mounted on autonomous vehicle 501*b*. As shown, rapid deceleration mechanism 350" is mounted on an inside of autonomous vehicle 501*b* near a bottom of autonomous vehicle 501*b* such that first anchor 454*a"* is positioned substantially in back of a front wheel 546*a'* of vehicle 501*b*, and in front of a rear wheel 546*b'* of vehicle 501*b*.

Figure 6A:
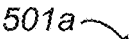
FIG. 6A is a diagrammatic representation of a side view of a vehicle, e.g., vehicle 501a of FIG. 5A, in a second state, e.g., a state in which anchor 454a' has been deployed, in accordance with an embodiment.
Figure 6A:
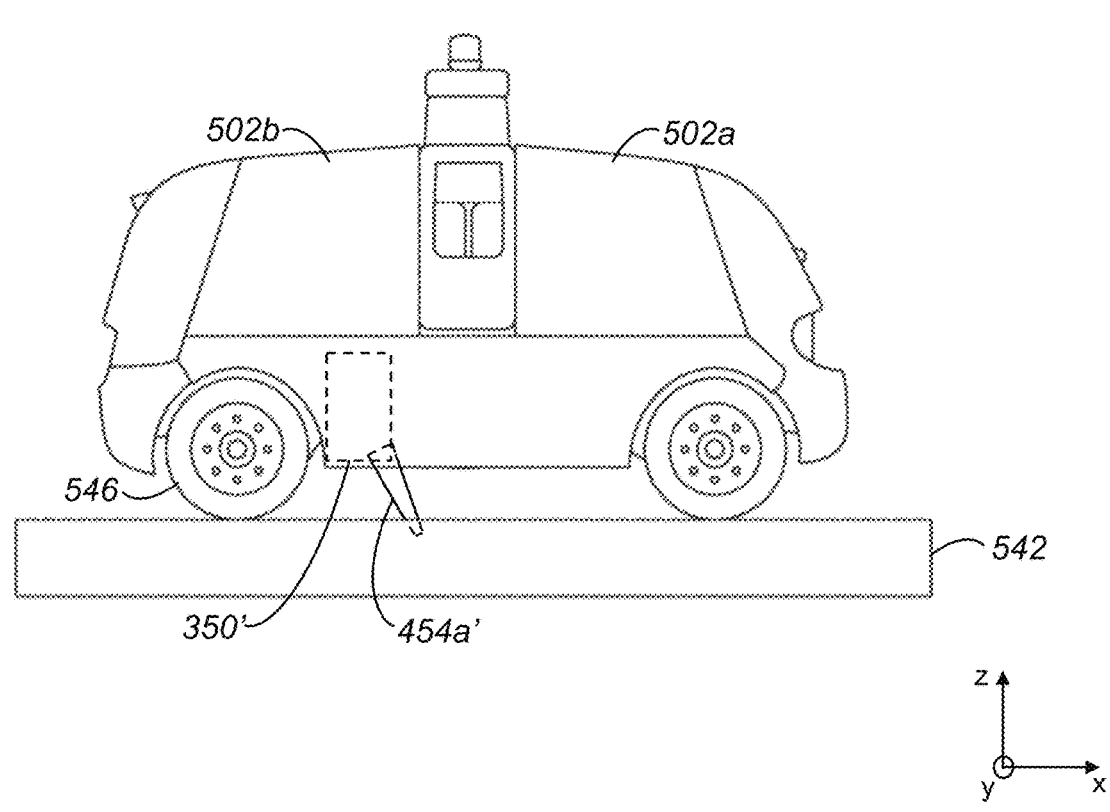

FIG. 6A depicts vehicle 501*a* in a second state, e.g., a state in which anchor 454*a'* has been deployed, in accordance with an embodiment. When anchor 454*a'* is in a deployed configuration, anchor 454*a'* is anchored in surface 542. That is, deployed anchor 454*a'* is substantially secured in or at least partially embedded in surface 542. When vehicle 50*a*1 is substantially anchored, hooked, or otherwise attached to surface 542, vehicle 501*a* may be prevented from continuing to travel along the x-axis.

Figure 6B:
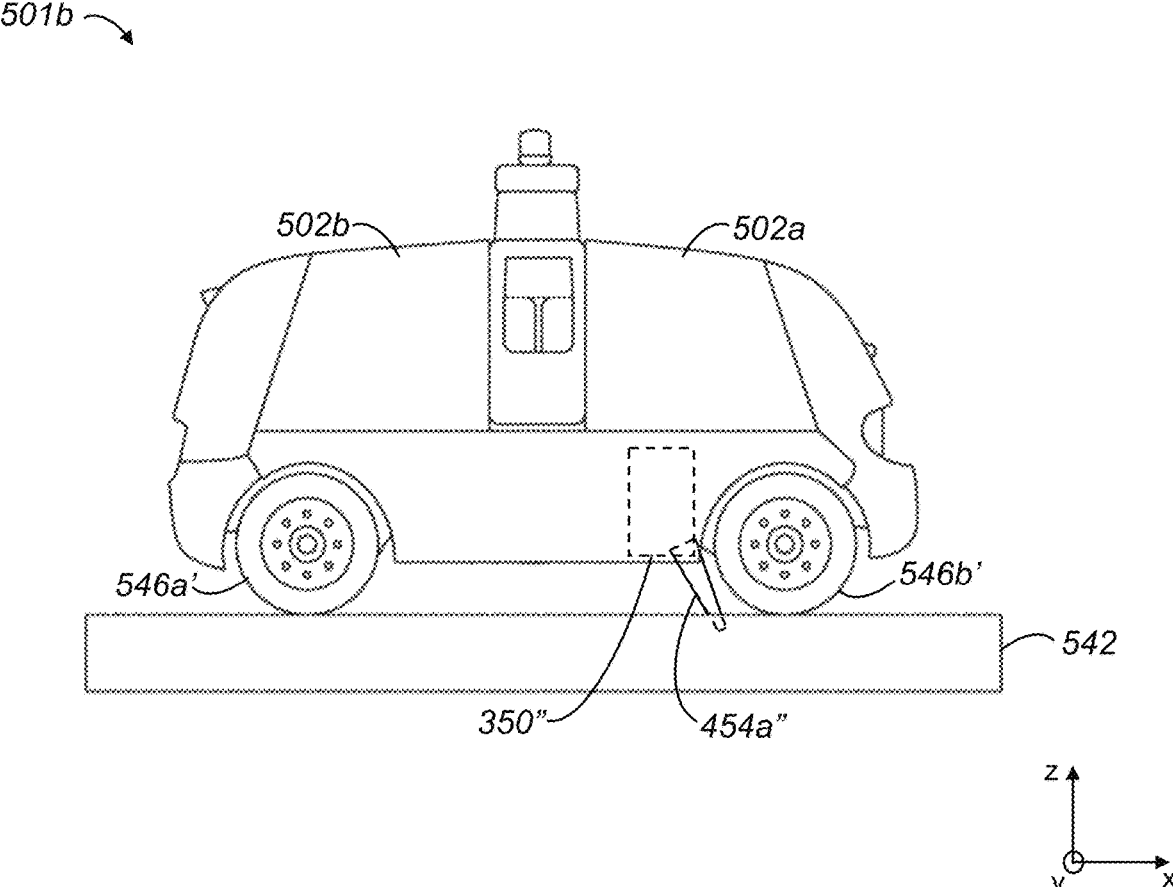
FIG. 6B is a diagrammatic representation of a side view of a vehicle, e.g., vehicle 501b of FIG. 5B, in a second state, e.g., a state in which anchor 454a has been deployed, in accordance with an embodiment.

FIG. 6B depicts vehicle 501*b* in a second state, e.g., a state in which anchor 454*a"* has been deployed, in accordance with an embodiment. When anchor 454*a"* is in a deployed configuration, anchor 454*a"* is anchored in surface 542 such that vehicle 501*b* may be prevented from continuing to travel along the x-axis.

Figure 7:
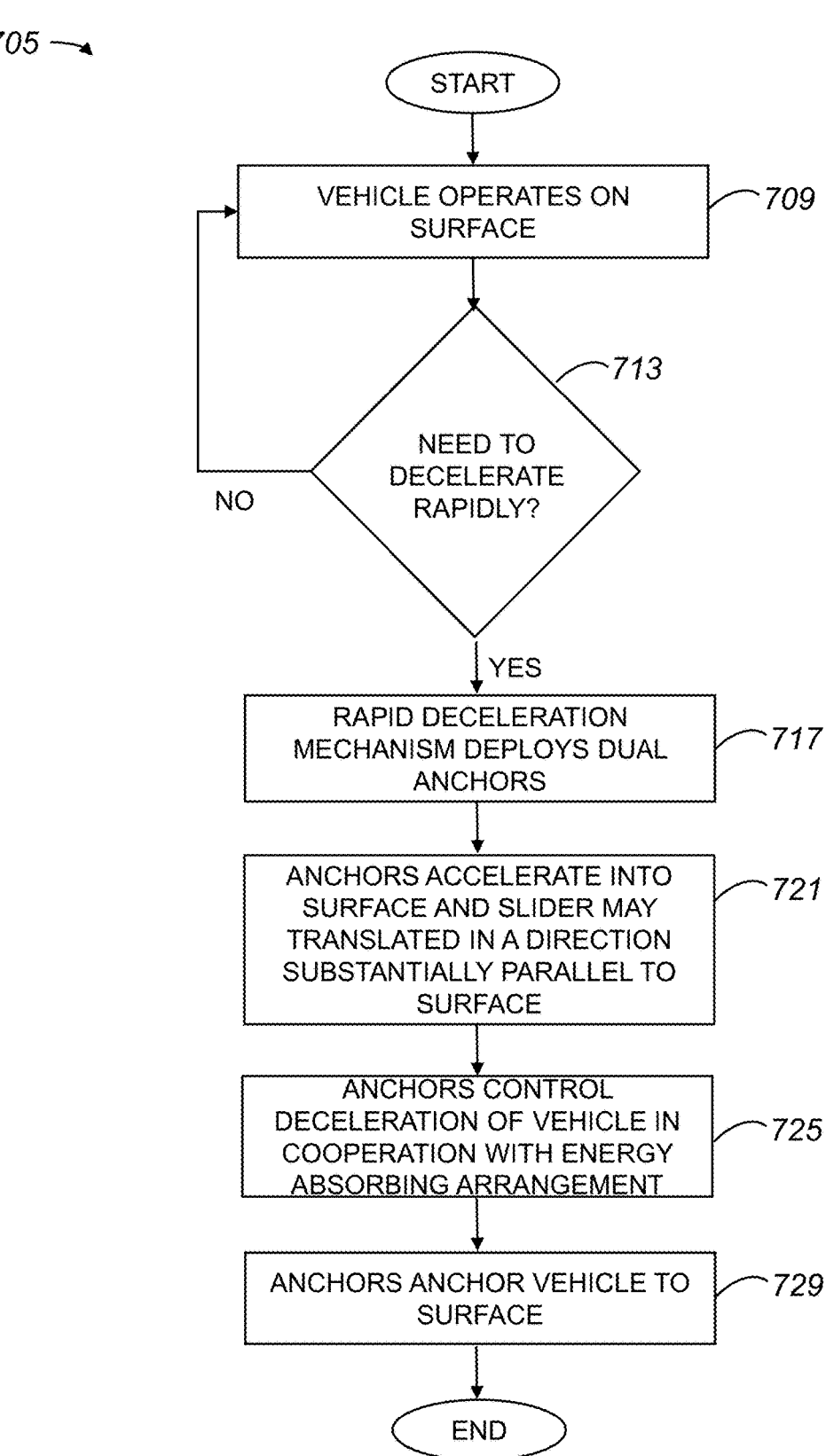
FIG. 7 is a process flow diagram which illustrates a method of utilizing a rapid deceleration mechanism that includes at least one anchor arrangement which includes a slider in accordance with an embodiment.

Referring next to FIG. 7, a method of utilizing a rapid deceleration mechanism that includes at least one anchor arrangement which includes a slider will be described in accordance with an embodiment. A method 705 of utilizing a rapid deceleration mechanism or system begins in a step 709 in which a vehicle operates, e.g., drives, on a surface. In one embodiment, the vehicle is an autonomous vehicle and the surface may be a concrete or asphalt surface of a roadway.

A determination is made in a step 713 as to whether there is a need for the vehicle to decelerate rapidly. Such a determination may be made when the vehicle determines, as for example using sensors onboard the vehicle, that a collision with an obstacle such as a pedestrian is likely imminent unless the vehicle decelerates rapidly. In one embodiment, a determination of whether there is a need for the vehicle to decelerate rapidly may include identifying whether a primary braking system of the vehicle may be sufficient to achieve the necessary deceleration, or the deceleration needed to avoid a collision with an obstacle. It should be appreciated that the factors used to determine whether a vehicle is to decelerate rapidly using a deceleration system may vary widely.

If the determination in step 713 is that there is no need for the vehicle to decelerate rapidly, process flow returns to step 709 in which the vehicle continues to operate on the surface. Alternatively, if it is determined in step 713 that there is a need for the vehicle to decelerate rapidly, the process flow moves to a step 717 in which a rapid deceleration mechanism is effectively activated. Activating the rapid deceleration mechanism causes the rapid deceleration mechanism to deploy anchors, e.g., anchors coupled to a slider, using an energetics arrangement such as a powered driver. The anchors may generally be deployed in a substantially downwards direction. In one embodiment, initiating deployment of the rapid deceleration mechanism includes sending an instruction, e.g., via a processor and/or control system, to engage an energetics arrangement of the rapid deceleration mechanism. For example, a control system in cooperation with a processor may send an instruction to a propulsion system of the vehicle which includes the rapid deceleration mechanism.

In a step 721, the anchors accelerate into the surface such that the anchors may penetrate a top plane of the surface. That is, the ends or tips of the anchors may break through the surface by puncturing, shattering, compressing, cutting, and/or cracking the surface. In some instances, when anchors accelerated into the surface, sliders coupled to the anchors may slide. By way of example, due to characteristics of concrete and asphalt, sliders may move when the surface is concrete and sliders may remain substantially unmoved when the surface is asphalt.

Once the anchors accelerate into the surface, the anchors effectively control the deceleration of the vehicle in cooperation with an energy absorbing arrangement in a step 725. The deceleration of the vehicle is controlled as the anchors break through a plane of the surface. The energy absorbing arrangement may be part of the rapid deceleration mechanism, and/or the energy absorbing arrangement may be part of the vehicle, as for example part of a frame or chassis of the vehicle. The energy removal or dissipation that is typically needed to decelerate a vehicle to a stop may be performed by both crushing or deforming part of the vehicle frame, as for example a part of the vehicle frame in front of back wheels and/or back wheel wells, as well as by the bending of the anchors. In one embodiment, energy removal or dissipation may be associated with a sliding of one or more sliders, and by the deformation of one or more energy absorbing arrangements.

The anchors anchor the vehicle to the surface in a step 729. That is, the vehicle comes to a stop when the anchors become substantially anchored in the surface. Upon the vehicle becoming anchored to the surface, the method of utilizing a rapid deceleration mechanism is completed.

Figure 8:
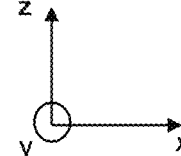
FIG. 8 is a diagrammatic cross-sectional representation of a rapid deceleration mechanism which includes a slider and an anchor in accordance with an embodiment.

One embodiment of a rapid deceleration mechanism that includes an anchor and a slider will be described with respect to FIG. 8. FIG. 8 is a diagrammatic cross-sectional representation of a rapid deceleration mechanism which includes a slider and an anchor in accordance with an embodiment. A rapid deceleration mechanism 852 includes an anchor 860 and a slider 862. Slider 862 may be arranged to move, e.g., slide, along an x-axis when anchor 860 is deployed. In one embodiment, slider 862 may be mounted on or otherwise coupled to a frame of a vehicle (not shown) such that slider 862 may slide with respect to the frame. When anchor 860 is deployed, anchor 860 may move within a barrel portion 864 of slider 862. Barrel portion 864 is generally arranged to support anchor 860 with respect to slider 862 such that anchor 860 may be positioned at a desired location relative to a vehicle.

Figure 9:
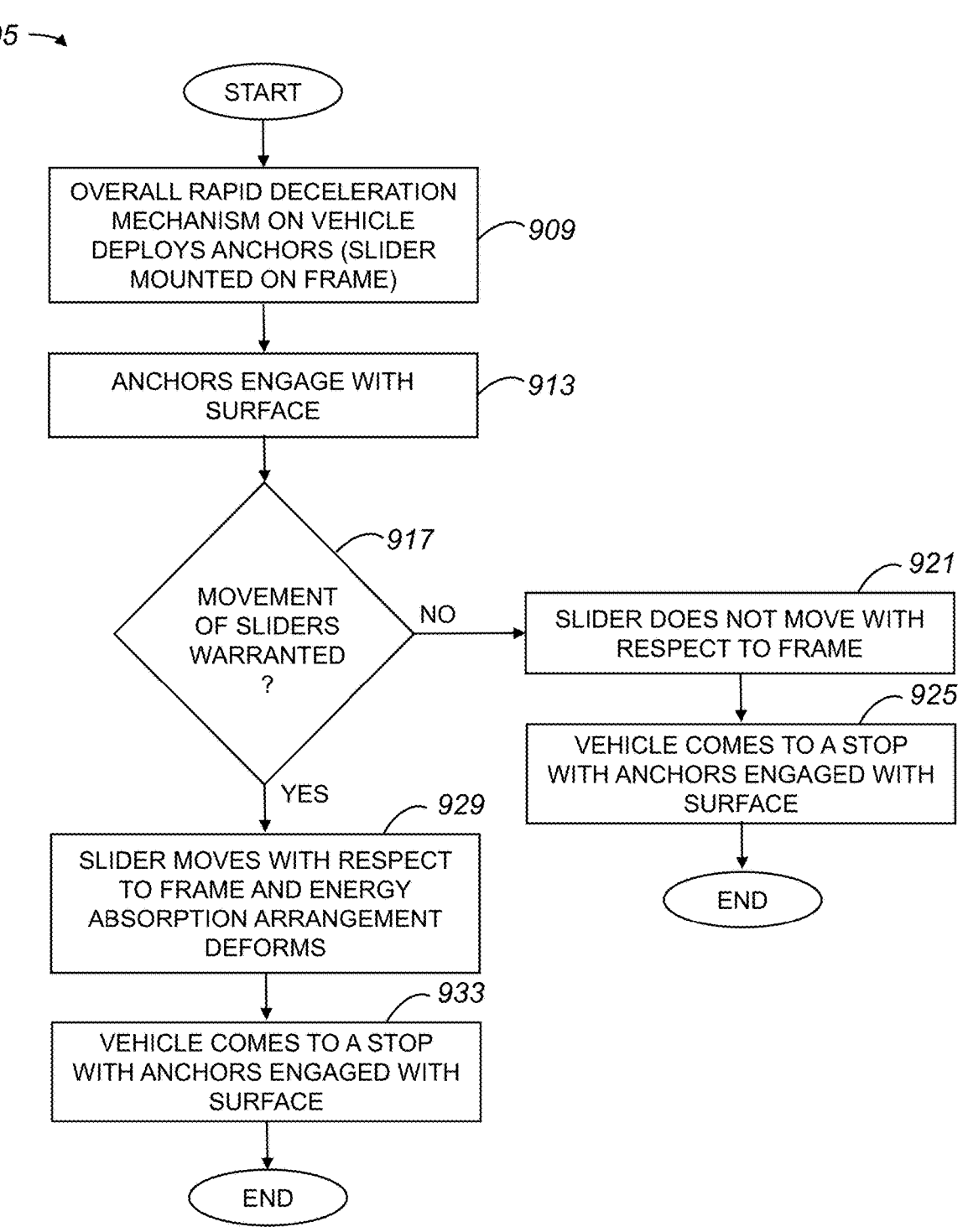
FIG. 9 is a process flow diagram which illustrates actions associated with a rapid deceleration mechanism that includes at least one anchor and at least one sliding carriage or slider in accordance with an embodiment.

With reference to FIG. 9, the deployment of at least one anchor of a rapid deceleration mechanism that also includes a sliding carriage or a slider to bring a vehicle to a stop will be described in accordance with an embodiment. A process 905 of bringing a vehicle to a stop begins at a step 909 in which an overall rapid deceleration mechanism on a vehicle deploys anchors. It should be appreciated that while the use of more than one anchor is described, an overall rapid deceleration mechanism may include a single anchor. Each anchor may be supported by a barrel of a slider, and the sliders may be mounted on a frame of the vehicle such that the sliders may slide with respect to the frame.

Once the anchors are deployed, the anchors engage with a surface in a step 913. For example, the anchors may break through or otherwise penetrate a roadway surface. A determination is made in a step 917 as to whether movement of sliders is warranted. That is, it is determined whether energy dissipation is such that sliders of the overall rapid deceleration system may move with respect to the vehicle frame. In one embodiment, such a determination involves ascertaining if energy associated with the deployment of anchors is adequately dissipated through the surface.

If the determination in step 917 is that movement of sliders is not warranted, the slider does not move with respect to the vehicle frame in a step 921. In a step 925, the vehicle comes to a stop with the anchors engaged with the surface, and the process of bringing a vehicle to a stop is completed.

Alternatively, if the determination in step 917 is that movement of sliders is warranted, then in a step 929, the slider moves with respect to the frame, and also causes an energy absorbing arrangement to deform. The movement of the slider effectively causes energy associated with the deployment of the anchors to essentially be absorbed by one or more energy absorbing arrangements.

After the slider moves with respect to the frame and the energy absorbing arrangement deforms, the vehicle comes to a stop with anchors engaged in the surface in a step 933. The process of bringing a vehicle to a stop is then completed.

Figure 10A:
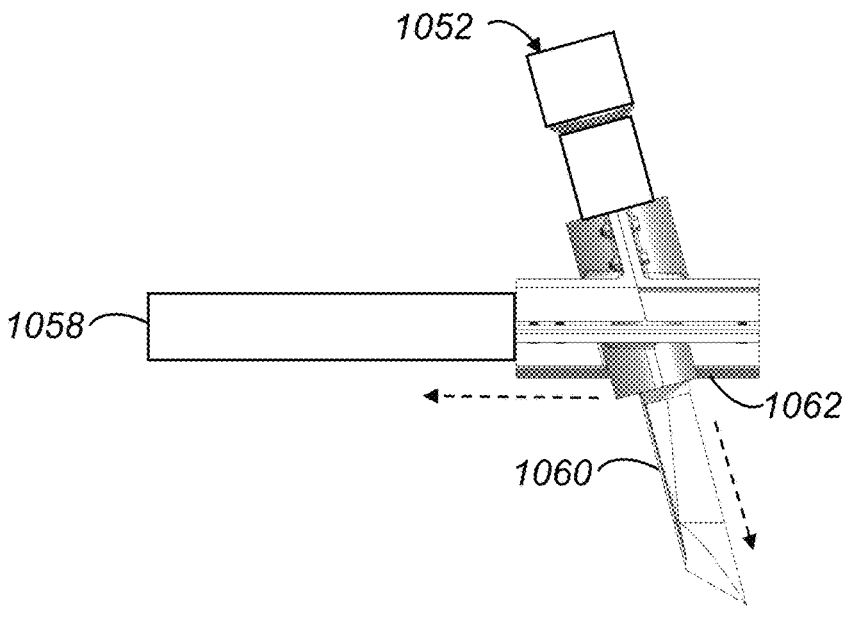
FIG. 10A is a diagrammatic representation of a rapid deceleration mechanism at a time t1 at which an energy absorbing arrangement has not been deformed in accordance with an embodiment.
Figure 10A:
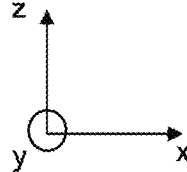

When a slider of a rapid deceleration mechanism moves, as for example laterally along a horizontal axis, when an anchor is deployed from the rapid deceleration mechanism, an energy absorbing arrangement may deform to effectively absorb at least some energy associated with the deployment of the anchor. FIG. 10A is a diagrammatic representation of a rapid deceleration mechanism at a time t1 at which an energy absorbing arrangement has not been deformed in accordance with an embodiment. At a time t1, a rapid deceleration mechanism 1052 deploys an anchor 1060 into a surface (not shown). When anchor 1060 penetrates the surface (not shown), a slider 1062 of rapid deceleration mechanism 1052 begins to move along an x-direction and, hence, begins to transfer energy to an energy absorbing arrangement 1058. Slider 1062 begins to move along an x-direction or along an x-axis, while anchor 1060 is deployed in and penetrates the surface (not shown) relative to another direction, e.g., at least partially in a z-direction. In one embodiment, energy absorbing arrangement 1058 may be a crush can or a crumple zone configured to deform to effectively absorb energy. It should be appreciated, however, that energy absorbing arrangement 1058 is not limited to being a crush can or a crumple zone. Other suitable energy absorbing arrangements 1058 may include, but are not limited to including, hydraulic arrangements, pneumatic arrangements, inflatable air springs, automotive struts such as those including springs and/or viscoelastic dampers, liquid filled bladders or containers, a series of shear pins that absorb energy each time a vehicle carriage shears off a pin protruding from the side of the vehicle carriage, a shearing blade on the side of a vehicle carriage that substantially shaves off a layer of metal from the vehicle carriage to absorb energy, a panel of sheet metal that is substantially ripped from a larger sheet of metal to absorb energy, and/or air bladders.

Figure 10B:
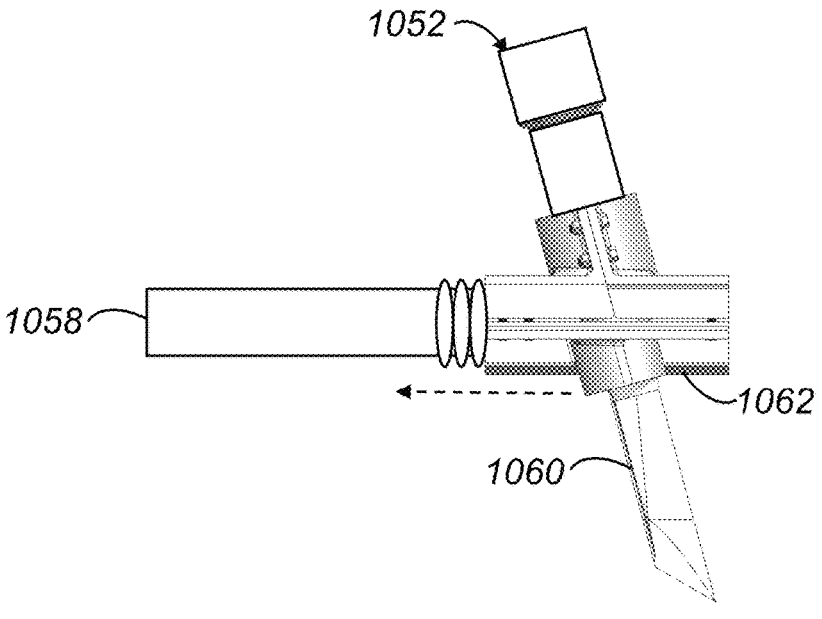
FIG. 10B is a diagrammatic representation of a rapid deceleration mechanism, e.g., rapid deceleration mechanism 1052 of FIG. 10A, at a time t2 at which an energy absorbing arrangement e.g., energy absorbing arrangement 1058 of FIG. 10A, has been deformed in accordance with an embodiment.
Figure 10B:
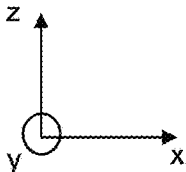

At a time t2, energy absorbing arrangement is deformed, as shown in FIG. 10B. When anchor 1060 penetrates a surface (not shown) that is formed from a material such as concrete, energy associated with the deployment of anchor 1060 may cause slider 1062 to move and to transfer energy to energy absorbing arrangement 1058 which then deforms, e.g., crushes or crumples, as energy is absorbed.

In one embodiment, a vehicle may include multiple rapid deceleration mechanisms that may be coupled such that sliders move substantially together. That is, an overall rapid deceleration system may include rapid deceleration mechanisms with sliders that are physically coupled such that the sliders move together. By way of example, sliders associated with two rapid deceleration mechanisms may be coupled or otherwise linked together.

Figure 11A:
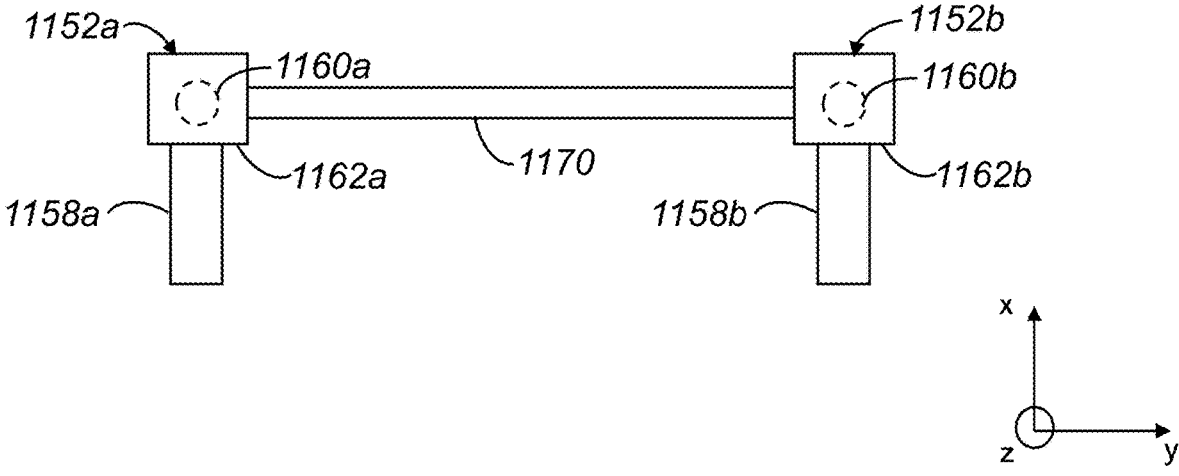
FIG. 11A is a diagrammatic representation of a plurality of rapid deceleration mechanisms that include sliders which are coupled at a time t1 at which energy absorbing arrangement have not been deformed in accordance with an embodiment.

FIG. 11A is a diagrammatic representation of a plurality of rapid deceleration mechanisms that include sliders which are coupled at a time t1 at which the energy absorbing arrangement has not been deformed in accordance with an embodiment. A first rapid deceleration mechanism 1152a includes a first slider 1162a that is arranged to interface with a first energy absorbing arrangement 1158a such that first energy absorbing arrangement 1158a may absorb energy associated with the deployment of a first anchor 1160a via first slider 1162a. That is, first slider 1162a may transfer energy that is generated when first anchor 1160a is deployed to first energy absorbing arrangement 1158a. A second rapid deceleration mechanism 1152b includes a second slider 1162b that is arranged to interface with a second energy absorbing arrangement 1158b such that second energy absorbing arrangement 1158b may absorb energy associated with the deployment of a second anchor 1160b.

At a time t1, anchors 1160a, 1160b are undeployed and, as such, energy absorbing arrangements 1158a, 1158b have not absorbed energy and, in one embodiment, are undeformed. In one embodiment, energy absorbing arrangements 1158a, 1158b are substantially fixed relative to the vehicle on which energy absorbing arrangements are mounted. By way of example, energy absorbing arrangements 1158a, 1158b may be mounted on a chassis or frame of a vehicle.

First slider 1162a and second slider 1162b are coupled, e.g., linked, by a coupler 1170. Coupler 1170 may be any suitable structure which physically connects sliders 1162a, 1162b. When sliders 1162a, 1162b move, coupler 1170 moves with sliders 1162a, 1162b.

Figure 11B:
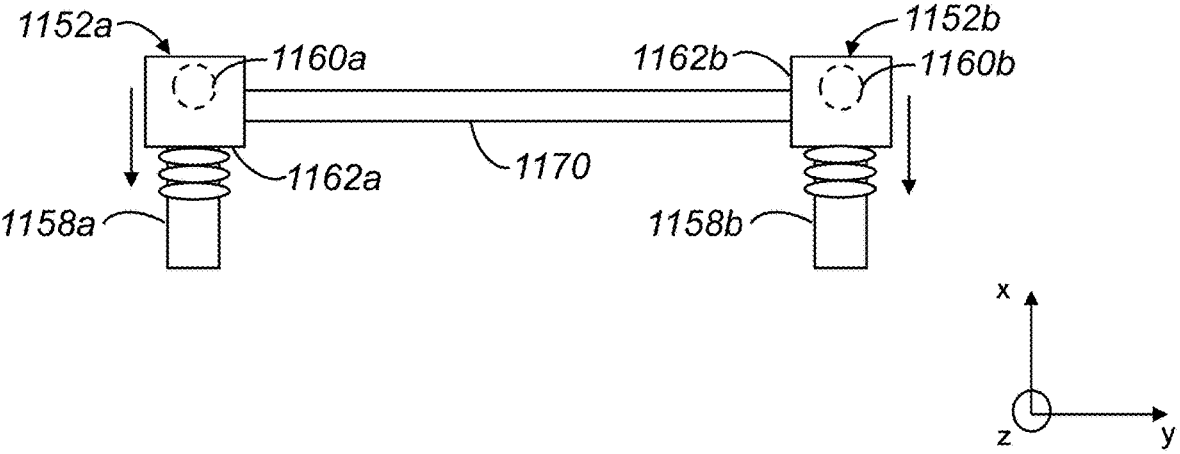
FIG. 11B is a diagrammatic representation of a plurality of rapid deceleration mechanisms that include sliders which are coupled, e.g., rapid deceleration mechanism 1152a with slider 1162a and rapid deceleration mechanism 1152b with slider 1162b of FIG. 11A, at a time t2 at which energy absorbing arrangements e.g., energy absorbing arrangements 1158a and 1158b of FIG. 11A, have been deformed in accordance with an embodiment.

At a time t2, as shown in FIG. 11B, anchors 1160a, 1160b are deployed, and sliders 1162a, 1162b have moved in an x-direction. Because coupler 1170 is coupled to sliders 1162a, 1162b, coupler 1170 has also moved in an x-direction. Sliders 1162a, 1162b may move on substantially parallel rails or tracks (not shown) while coupler 1170 is supported between sliders 1162a, 1162b.

When sliders 1162a, 1162b move in an x-direction, sliders 1162a, 1162b cause energy associated with the deployment of anchors 1160a, 1160b to be absorbed by energy absorbing arrangements 1158a, 1158b. Generally, as energy absorbing arrangements 1158a, 1158b absorb energy such as kinetic energy, energy absorbing arrangements 1158a, 1158b may undergo a physical change. For example, when energy absorbing arrangements 1158a, 1158b are crush cans or boxes, energy absorbing arrangements 1158a, 1158b may crumple or buckle under a load associated with the deployment of anchors 1160a, 1160b, as shown. That is, energy absorbing arrangements 1158a, 1158b, which may be formed from a material such as aluminum, may bend. The amount by which energy absorbing arrangement 1158a, 1158b are deformed is dependent upon factors including, but not limited to including, the magnitudes associated with the movement of sliders 1162a, 1162b and/or the amounts of force used to launch, propel, or deploy anchors 1160a, 1160b.

Figure 12:
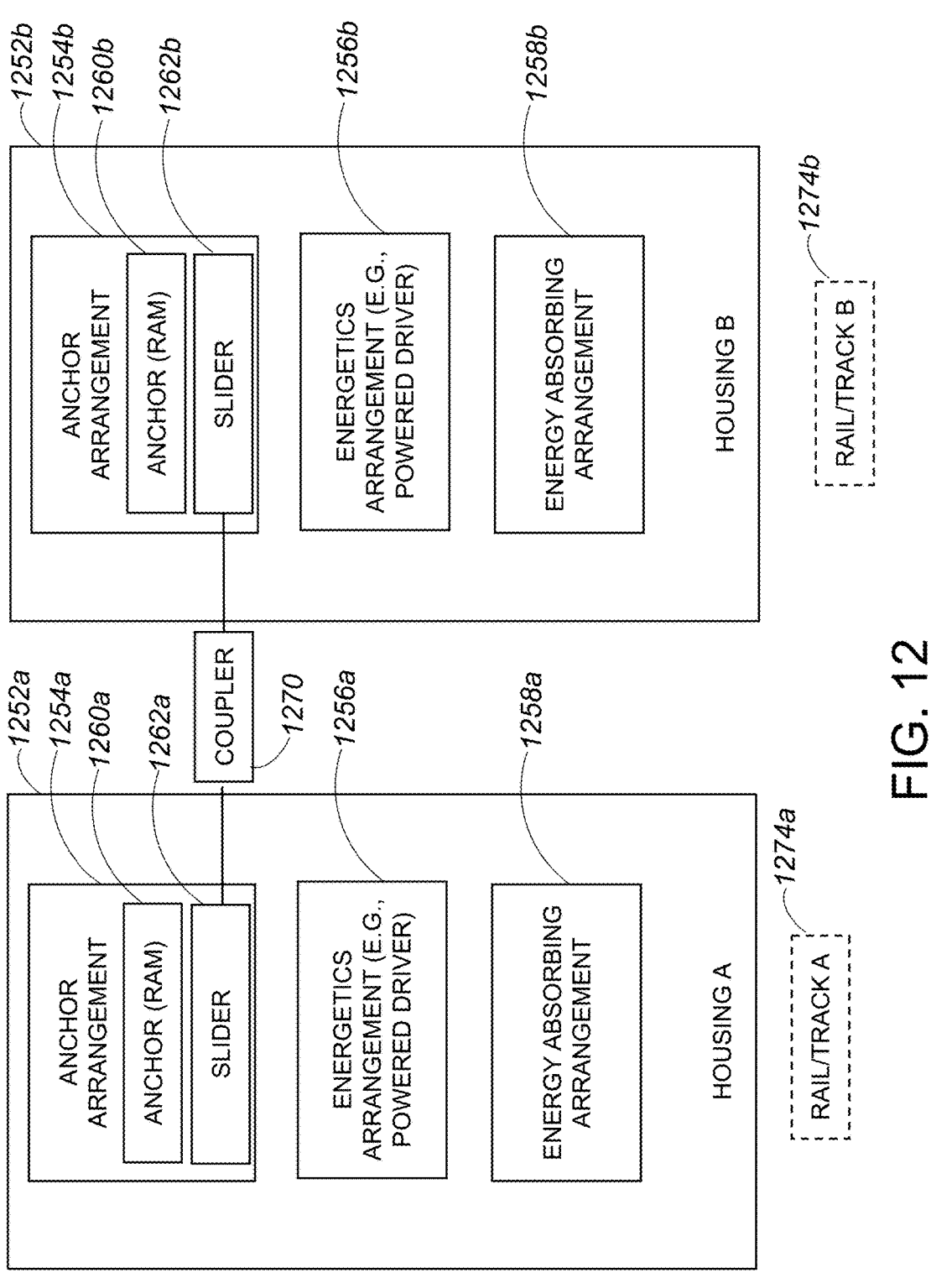
FIG. 12 is a block diagram representation of a rapid deceleration system that includes coupled sliders in accordance with an embodiment.

With reference to FIG. 12, an overall rapid deceleration system which includes a coupler that couples a plurality of sliders will be described. FIG. 12 is a block diagram representation of an overall rapid deceleration system that includes coupled sliders in accordance with an embodiment. An overall energy absorbing system 1250 includes a first housing 1252a, a second housing 1252b, and optional rails or tracks 1274a, 1274b. First housing 1252a and second housing 1252b are arranged to be mounted or otherwise coupled to a vehicle, e.g., to a chassis of a vehicle.

First housing 1252a includes an anchor arrangement 1254a that has an anchor 1260a and a slider 1262a. First housing 1252a also includes an energetics arrangement 1256a and an energy absorbing arrangement 1258a. Second housing 1252b includes an anchor arrangement 1254b that has an anchor 1260b and a slider 1262b. Second housing 1252b also includes an energetics arrangement 1256b and an energy absorbing arrangement 1258b.

A coupler 1270 is configured to couple, or to otherwise connect, slider 1262a and slider 1262b. In one embodiment, coupler 1270, slider 1262a, and slider 1262b may be a substantially single structure that is configured to slide upon anchors 1260a, 1260b being propelled, launched, deployed, or fired into a surface. Coupler 1270 enables sliders 1262a, 1262b to move together, as for example such that the displacement or amount of translation of sliders 1262a, 1262b may be approximately the same.

An optional first rail 1274a is arranged such that slider 1262a may slide or translate along first rail 1274a upon the deployment of anchor 1260a, and an optional second rail 1274b is arranged such that second slider 1262b may slide or translate along second rail 1274b upon the deployment of anchor 1260b. Optional rails 1274a, 1274b may be coupled to a vehicle, e.g., to a chassis of a vehicle, and may generally be arranged to guide the movement of sliders. It should be appreciated that in lieu of optional rails 1274a, 1274b, optional tracks, channels, or other structures may be used on a vehicle to substantially guide and/or constrain the movement of sliders 1262a, 1262b.

To reduce friction on optional rails 1274a, 1274b, a material such as steel may be used to form optional rails 1274a, 1274b. In one embodiment, optional rails 1274a, 1274b may be linear bearing tracks located between, and effectively attached to, a vehicle chassis and sliders 1262a, 1262b. To further reduce friction, blocks (not shown) may be attached to a chassis of vehicle such that the blocks may substantially touch sliders 1262a, 1262b as well as the chassis to enable sliding relative to sliders 1262a, 1262b and the chassis. Such blocks may be formed from materials including, but not limited to including, low friction HDPE, nylon, graphite, and the like.

Although only a few embodiments have been described in this disclosure, it should be understood that the disclosure may be embodied in many other specific forms without departing from the spirit or the scope of the present disclosure. By way of example, whether or not a slider of a rapid deceleration mechanism moves substantially as a reaction to the deployment of an anchor may generally depend upon the material into which the anchor is deployed. In one embodiment, when the material into which an anchor is deployed is concrete or similar to concrete, then the slider will generally move along a frame on which the slider is mounted. In another embodiment, when the material into which the anchor is deployed is asphalt or similar to asphalt, then the slider will generally not move along a frame on which the slider is mounted.

Energy associated with the deployment of anchors into a surface may be absorbed by the surface and/or by a substantially separate energy absorbing arrangement, as for example a crush can that may be tuned. Some surfaces may absorb more deployment energy than others. For example, the deformation of some surfaces as anchors deploy into the surfaces may essentially be sufficient to absorb energy associated with the deployment. A rapid deceleration mechanism that includes an anchor and a slider may support the use of the anchor to effectively cut a channel into a surface in some situations and the use of the anchor essentially as a bollard in other situations. That is, when an anchor is supported on a slider, the anchor may act as a plow in some surfaces and as a bollard in other surface.

A slider or sliding carriage is generally configured to hold a barrel which supports an anchor in a desired position with respect to a vehicle. That is, a barrel, which may be integrally formed as part of a slider, may support an anchor such that the anchor may be held in a desired location with respect to a vehicle and, when the anchor is deployed, may enable the anchor to slide therein.

When sliders of two or more rapid deceleration arrangements are coupler, by a coupled, energy associated with the deployment of anchors and motion of the sliders may be absorbed by separate energy absorption arrangement. It should be appreciated in lieu of having separate energy absorption arrangements, two or more rapid decelerations arrangements may instead have a substantially shared energy absorption arrangement, or may have individual energy absorption arrangements that are physically coupled without departing from the spirit or the scope of the disclosure.

In one embodiment, an energy absorbing arrangement of a rapid deceleration mechanism mounted on a vehicle may be a system that includes an air bladder which may effectively deflate as a slider of the energy absorbing arrangement slides after the deployment of an anchor or ram of the energy absorbing arrangement. As the air bladder deflates, air that is substantially expelled from the air bladder may be redirected to effectively provide a reverse thrust to further enhance the ability for the vehicle to rapidly decelerate. The air flow from the air bladder may be redirected using hoses, manifolds, and/or other mechanical structures such that the air flow provides a thrust.

While a slider or sliding carriage has generally been described as providing linear motion, e.g., motion along an x-direction, a slider may additionally be arranged to provide rotational motion. That is, a slider may slide relative to one axis and rotate relative to another axis without departing from the spirit or the scope of the disclosure.

An autonomous vehicle has generally been described as a land vehicle, or a vehicle that is arranged to be propelled or conveyed on land. It should be appreciated that in some embodiments, an autonomous vehicle may be configured for water travel, hover travel, and/or air travel without departing from the spirit or the scope of the present disclosure. In general, an autonomous vehicle may be any suitable transport apparatus that may operate in an unmanned, driverless, self-driving, self-directed, and/or computer-controlled manner.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, the systems of an autonomous vehicle, as described above with respect to FIG. 3, may include hardware, firmware, and/or software embodied on a tangible medium. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples are not to be limited to the details given herein, but may be modified within the scope of the appended claims.

What is claimed is:

1. A vehicle comprising:
a body; and
a rapid deceleration system configured to decelerate the body traveling on a road surface, the rapid deceleration system including
at least a first rapid deceleration mechanism coupled to the body, the first rapid deceleration mechanism including a first anchor, a first slider, and a first energetics arrangement configured to propel the first anchor from the body toward the road surface to decelerate the body, wherein the first slider moves along a first axis to dissipate energy when the first anchor is propelled toward the road surface along a second axis;
a second rapid deceleration mechanism coupled to the body, the second rapid deceleration mechanism including a second anchor, a second slider, and a second energetics arrangement configured to propel the second anchor from the body toward the road surface to decelerate the body, wherein the second slider moves along the first axis to dissipate energy when the second anchor is propelled toward the road surface along the second axis; and
a coupler, the coupler being arranged to couple the first slider and the second slider such that the first slider and the second slider move along the first axis together.

2. The vehicle of claim 1 wherein the rapid deceleration system further includes a first energy absorbing arrangement, wherein the first slider is configured to cause the first energy absorbing arrangement to absorb energy as the first slider moves along the first axis.

3. The vehicle of claim 2 wherein the first energy absorbing arrangement is one selected from a group including a crush can, a pneumatic system, and an air bladder.

4. The vehicle of claim 2 wherein the first energy absorbing arrangement absorbs the energy by deforming.

5. The vehicle of claim 1 wherein the first energetics arrangement includes a powered driver or an actuating mechanism arranged to cause the first anchor to be fired from the body downward toward the road surface.

6. The vehicle of claim 1 wherein the body includes a frame or a chassis, the rapid deceleration system further including a first rail, and wherein the first slider is configured to move on the first rail along the first axis.

7. A rapid deceleration system comprising:
a first rapid deceleration mechanism including
at least a first anchor coupled to a body of a vehicle,
at least a first energetics arrangement configured to propel the at least first anchor in a first direction toward a road surface on which the vehicle is traveling to decelerate the vehicle, and
at least a first slider, the at least first slider arranged to move in a second direction when the first anchor is propelled toward the road surface;
a second rapid deceleration mechanism including
a second anchor,
a second energetics arrangement, and
a second slider, the second anchor coupled to the body, the second energetics arrangement configured to propel the second anchor in the first direction toward the road surface to decelerate the vehicle; and the second slider arranged to move in the second direction when the second anchor is propelled toward the road surface; and
a coupler, the coupler being configured to couple the first slider and the second slider such that the first slider and the second slider move in the second direction together.

8. The rapid deceleration system of claim 7 further including:
at least a first energy absorbing arrangement, the at least first energy absorbing arrangement configured to absorb energy when the at least first slider transfers the energy to the at least first energy absorbing arrangement.

9. The rapid deceleration system of claim 8 wherein the at least first energy absorbing arrangement is one selected from a group including a crush can, a pneumatic arrangement, and an air bladder.

10. The rapid deceleration system of claim 9 wherein the first energy absorbing arrangement absorbs the energy by deforming.

11. A method comprising:
deploying, from a vehicle, using at least a first energetics arrangement of a rapid deceleration system, at least a first anchor of the rapid deceleration system attached to a body of the vehicle in a first direction toward a surface on which the vehicle is travelling, wherein the rapid deceleration system further includes at least a first slider arranged to move in a second direction to absorb energy generated when the at least first anchor is deployed;

deploying, from the vehicle, using a second energetics arrangement of the rapid deceleration system, a second anchor of the rapid deceleration system attached to the body in the second direction toward the surface, wherein the rapid deceleration system further includes a second slider arranged to move in the second direction to absorb energy generated when the second anchor is deployed;

decelerating the vehicle by transferring the energy generated when the at least first anchor is deployed from the at least first slider to a first energy absorption arrangement; and decelerating the vehicle by transferring the energy generated with the second anchor is deployed from the second slider to a second energy absorption arrangement, wherein the first slider and the second slider are coupled, and wherein the first slider and the second slider move in the second direction together.

12. The method of claim 11 wherein decelerating the vehicle by transferring the energy generated when the first anchor is deployed from the at least first slider to the first energy absorption arrangement includes the first slider contacting the energy absorption arrangement to cause the first energy absorption arrangement to deform.

13. The method of claim 12 wherein the first energy absorption arrangement is one selected from a group including a crush can, a pneumatic arrangement, and an air bladder.

14. The method of claim 11 further including:

decelerating the vehicle by anchoring the at least first anchor into the surface.

15. The method of claim 14 further including:

decelerating the vehicle by anchoring the second anchor into the surface.

* * * * *